May 21, 1968 J. B. PIERRE ETAL 3,384,828

PHASE SHIFTING CIRCUITS

Filed Sept. 16, 1965

Inventors
JACQUES B. PIERRE
MARC J. T. SCHNEIDER
By Percy P. Lantzy
Attorney

United States Patent Office 3,384,828
Patented May 21, 1968

3,384,828

PHASE SHIFTING CIRCUITS

Jacques Barthelemy Pierre, Meudon, and Marc Jules Theodore Schneider, Versailles, France, assignors to International Standard Electric Corporation, New York, N.Y., a corporation of Delaware Filed Sept. 16, 1965, Ser. No. 487,835
Claims priority, application France, Sept. 23, 1964, 988,963, Patent 1,422,125
9 Claims. (Cl. 328—155)

ABSTRACT OF THE DISCLOSURE

An input sine-wave signal having a frequency F is frequency multiplied by a factor N, squared, differentiated and rectified to produce short duration pulses having a frequency 4F. These pulses control a binary counter to produce N square wave signals each having a frequency F phase shifted with respect to each other by 360°/N. These N signals are combined in an N-phase phase shifting condenser whose output signal shock excites a low pass filter having a cut-off frequency F to produce a sine-wave signal having a frequency F whose phase is controlled by the angular position of the shaft of the condenser.

The present invention concerns an improved phase shifting circuit using a phase shifting condenser to which rectangular signals are applied.

N-phase phase shifting condensers, where N is an integer equal to at least three and less than five, in other words, three or four, are well-known and are described in detail in volume 17 of the "MIT Radiation Laboratory Series," first edition, pages 288 through 299, hereafter referred to as reference (1).

In accordance with a technique described in the above cited portion of reference (1), N trains of sine-wave signals of frequency F, phase shifted by 360°/N with respect to each other, are applied to an N-phase phase-shifting condenser. The phase-shift of the output sine-wave signal of frequency F with respect to one of the input signals then varies in a continuous and linear way as a function of the angular rotation $\phi$ of the shaft of the phase-shifting condenser.

However, the precision of the circuit is limited and it can be shown for the case where N equals four that to obtain a precision of ±1% between the angular postion $\phi$ of the shaft of the phase shifting condenser and the corresponding value of the phase-shift, it is necessary for the amplitudes of the input signals to be equal within ±6% and for their relative phase-shifts to be equal to 90° within ±3.6%.

The transformation from single-phase to four-phase is generally obtained by means of resistor-capacitor phase-shifting networks and amplifying stages which do not enable the achievement of this accuracy over wide temperature ranges.

In the present invention there is applied to the phase-shifting condenser, rectangular signals whose respective amplitudes, rise and fall times, and phase-shifts are defined with very high accuarcy. The output signal—which comprises a spectrum line at the fundamental frequency F as well as numerous spectrum lines due to harmonics of this frequency—is applied to a low-pass filter of cut-off frequency close to F so that there is obtained a sine-wave signal at frequency F whose phase-shift is known with high accuracy.

The object of the present invention is, therefore, to realize a high-precision phase-shifting circuit using as a control device, an N-phase phase-shifting condenser.

Other objects, features and advantages of the present invention will appear upon reading the following description of an embodiment, the said description being made in relation to the accompanying drawings in which.

Figures 1, 2, 3:
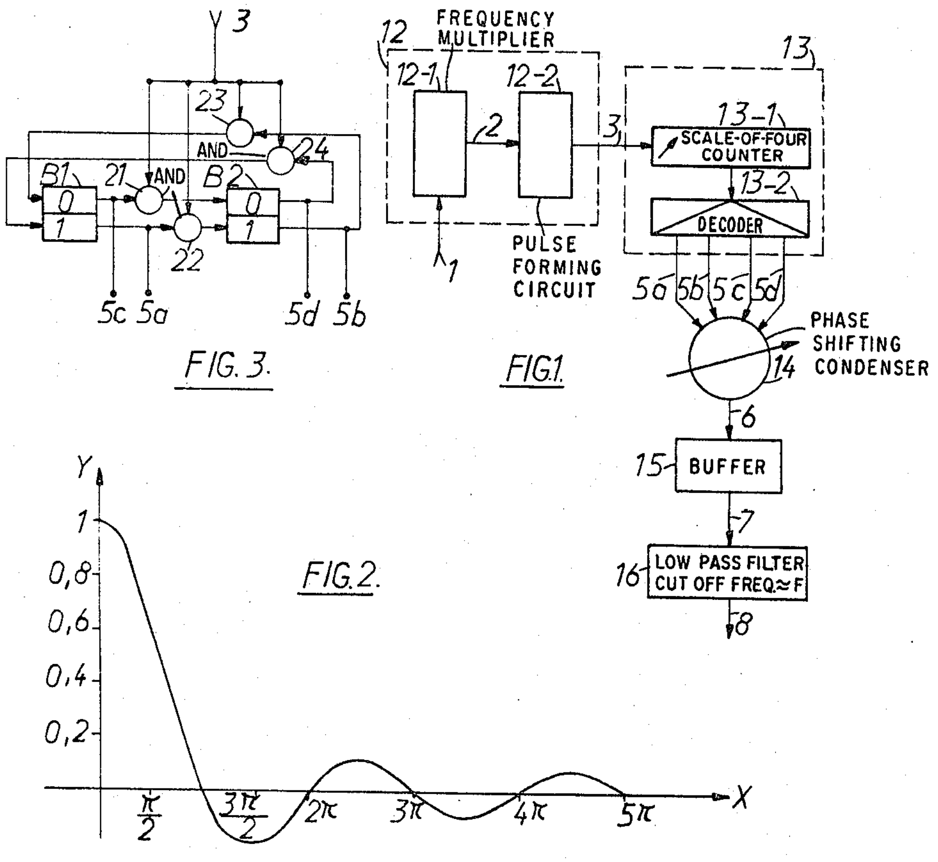
FIGURE 1 shows a block diagram of the phase-shifting circuit in accordance with the principles of this invention.
FIGURE 2 shows the curve $$y=\frac{\sin x}{x}$$
FIGURE 3 shows a block diagram of a scale-of-four ring counter that may be substituted for binary counter 13–1 and decoder 13–2 of FIGURE 1.

FIGURE 1 shows a block diagram of the phase shifting circuit according to the invention employing N-phase phase-shifting condenser as the phase control element. For purposes of explanation, N is assumed to be equal to four. The circuit receives sine-wave signals of frequency F on its input 1 and delivers, on its output 8, sine-wave signals of the same frequency whose phase-shift with respect to said input signals varies linearly as a function of the angular rotation $\phi$ of the shaft of the four-phase phase-shifting condenser 14.

Apart from condenser 14, the circuit comprises input circuit 12 which delivers on its output terminal 3 pulses of short duration having a frequency 4F, circuit 13 comprising scale-of-four counter 13–1 and decoder 13–2, buffer stage 15 with a high input impedance and low-pass filter 16 with a cut-off frequency close to F. Input circuit 12 can be realized by many known means and, in particular, by means of frequency multiplier 12–1 which is a frequency quadrupler when N equals four followed by a pulse-forming circuit 12–2. Multiplier 12–1 can be any of the circuits described in vol. 19 "MIT Radiation Laboratory Series," first ed. pp. 545–556. Pulse-forming circuit 12–2 can be realized by an amplifier, clipper, differentiator and rectifier as described in the text book of F. E. Terman, "Radio Engineering," third ed. pp. 600–602.

The pulses delivered by this circuit 12 are applied to the control input 3 of counter 13–1 and, hence, to decoder 13–2 which comprises four output terminals *5a*, *5b*, *5c*, *5d* on which signals of frequency F, phase shifted by 360°/N, or 90° when N equals four, with respect to each other, appear. These signals are applied to condenser 14 whose output terminal 6 is connected to the input terminal of buffer stage 15 which is used to match the high impedance of condenser 14 to that of filter 16.

Counter 13–1 in the case of N equals four includes two flip-flop stages to respond to the short duration pulses of frequency 4F at input 3 for binary counting thereof. Decoder 13–2 includes four AND gates each coupled to appropriate "1" and "0" outputs of flip-flop stages to produce the desired rectangular signals for the input to condenser 14. The principles of such an arrangement of a binary counter and AND gate decoder are taught in U.S. Patent 3,295,065.

The operation of the circuit of FIG. 1 can be summarized as follows. An input sine-wave signal having a frequency F is frequency multiplied by a factor N (N equals three or four) in multiplier 12–1. The frequency multiplied sine-wave signal is squared, differentiated and rectified in pulse-forming circuit 12–2 to produce short duration pulses having a frequency 4F. These pulses are applied through a scale-of-N counter 13–1 and decoder 13–2 to produce N square wave signals each having a frequency F and phase shifted with respect to each other by 360°/N (360°/4 equals 90° for the case of N equal to four and 360°/3 equals 120° for the case of N equal to three). These N square wave signals are combined in N-phase phase-shifting condenser 14 to produce a square wave signal having a frequency F and whose phase shift is determined by the angular position $\phi$ of the shaft of condenser 14 in accordance with the teachings of reference (1). The output of a condenser 14 shock excites filter 16 having a cut-off frequency close to F to produce an output 8 a sine-wave signal having a frequency F and whose phase shift is controlled by the angular position $\phi$ of the shaft of condenser 14.

The mixing of signals in the condenser 14 is effected in a linear way as taught in reference (1) and its output signal can be considered to comprise the same components as signals *5a, 5b, 5c, 5d*, with each of them capable of being studied separately.

FIGURE 2 represents the curve $y=\sin x/x$ which represents the amplitudes of the various components of a rectangular signal, with $x=n\pi d$ if $n$ is the number of the considered harmonic and $d$ the duty factor of the signal ($d<1$). It can be seen, on this curve, that every harmonic of order $$n=\frac{k}{d} \qquad (1)$$

has a null and amplitude ($k$ being an integer equal to or greater than 1).

If the counter is of the ordinary type comprising two flip-flops which change their states respectively at frequency 2F and at frequency F, the signals *5a, 5b, 5c, 5d*, each have a duration $1/4F$ i.e. a duty factor $d=1/4$.

According to Equation 1 this signal does not comprise the harmonics of order 4, 8, 12 etc. . . . but it can be seen on the curve of FIGURE 2 that the amplitude H2 of harmonic 2, of abscissa $x=\pi/2$ is important compared to the amplitude H1 of the fundamental since one has $H2/H1=0.7$.

In these conditions, it is necessary to use a filter 16 of very good quality to obtain a good elimination of the second harmonic, i.e. a good precision of the phase-shift.

If the signals delivered by the counter are treated in such a way that they each have a duration $1/2F$, i.e. a duty factor $d=1/2$, it can be shown that the second harmonic exists no longer, hence, an easier filtering.

Circuit 13 can also be replaced by a counter of the type described in the article entitled "Five Binary Counting Technique Makes Faster Decimal-Counting," which was published on Jan. 18, 1961, in Electronic Design (p. 34, author: Zoltan Tarczy-Hornoch).

To implement such a scale-of-four, counter, comprises two flip-flops which both change their states at frequency F so that the output signals have a duty factor $d=1/2$.

FIGURE 3 shows the diagram of this counter in which the flip-flops are labelled B1, B2 and which comprises also transfer AND gates 21, 22, 23, 24. A flip-flop, such as flip-flop B1, is either in "1 state" or in "0 state." Flip-flop B1 passes from 0 state to 1 state when AND gate 24 delivers a signal with positive polarity and it passes from 1 state to 0 state when AND gate 23 delivers a positive signal.

To make the description easier, it will be assumed that each flip-flop is designed in such a way that a voltage of the same polarity as that of the control signals appears on its output terminal 1 when it is in the 1 state and on its output terminal 0 when it is in the 0 state.

The transfer gates or "AND gates" 21 to 24 comprise two control inputs. When two positive signals are simultaneously applied to the two input terminals of gate 24, for instance, the latter delivers a positive signal which sets flip-flop B1 to the 1 state.

Figure 4:
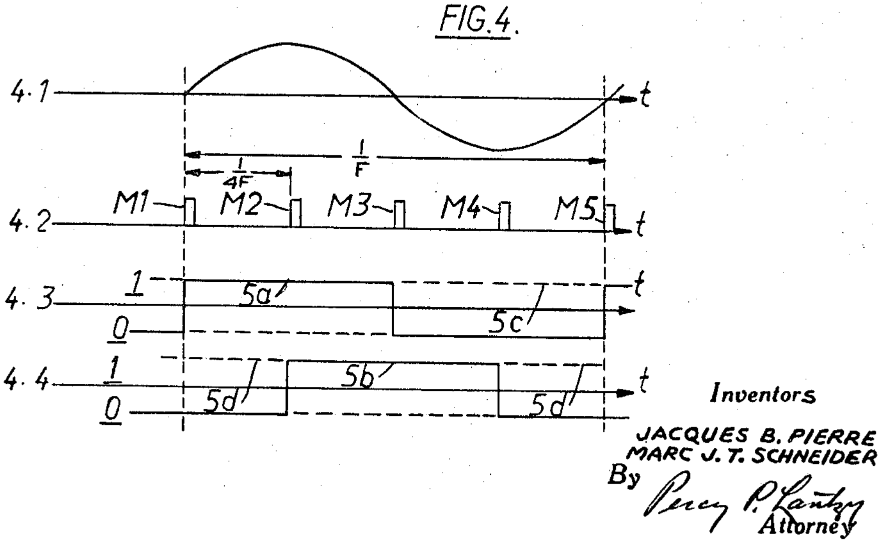
FIGURE 4 shows a certain number of diagrams of signals related to the operation of the counter in FIGURE 3.

The advance signals which will be designated by M1, M2, M3 etc. . . . in diagram 4.2 of FIGURE 4 are applied to the control input 3 of the transfer gates.

If the two flip-flops are initially in the 0 state, the first advance signal M1 passes through gates 21 and 24 so that flip-flop B1 goes to the 1 state and flip-flop B2 remains in the 0 state.

FIGURE 4 represents a certain number of diagrams related to this counter. Diagram 4.1 shows a period of the sine-wave signal 1 of frequency F. Diagram 4.2 shows the advance signals M1, M2, etc. . . . of frequency 4F delivered by circuit 12. Diagrams 4.3 and 4.4 show the states of flip-flops B1 and B2. On these diagrams, the 1 state of a flip-flop is represented by a signal above the time axis and the 0 state by a signal below that axis. The solid line of diagram 4.3 represents the pulse output *5a* from the "1" output of flip-flop B1 and the dotted line of diagram 4.3 represents the pulse output *5c* from the "0" output of flip-flop B1. The solid line of diagram 4.4 represents the pulse output *5b* from the "1" output of flip-flop B2 and the dotted line of diagram 4.4 represents the pulse output *5b* from the "0" output of flip-flop B2. These four pulse outputs of diagrams 4.3 and 4.4 illustrate the desired input signals to condenser 14 having a frequency F and phase shifted 90° with respect to each other.

It can be seen, on these diagrams, that after signal M1, flip-flop B1 is in the 1 state and flip-flop B2 in the 0 state as was previously shown. It is likewise shown that the two flip-flops B1 and B2 store the numbers 11, 01, 00 after the signals M2, M3 and M4, respectively.

It can be seen on these diagrams 4.3 and 4.4 that each flip-flop changes its state for every second advance signal only and that the duty factor of signals *5a* to *5d* collected from the output terminals of these flip-flops is ½. These signals are in quadrature one with respect to the other and are obtained directly on the output terminals 0 and 1 of the flip-flops without necessitating any decoding.

According to Equation 1, none of these signals comprises even harmonics and, if H3 designates the amplitude of the third harmonic—of abscissa $3\pi/2$ on the curve of FIGURE 2—there is obtained $H3/H1=1/3$.

If A1 and A3 designates the attenuation of filter 16 at frequencies F and 3F, respectively, the relative amplitude of the parasitic signal at the output of the filter is $\frac{1}{3}\,A1/A3$.

If the phase-shifting condenser and the input signals are perfect, this produces a phase error whose maximum relative value is:

$$\frac{d\phi}{2\pi}\max=\frac{1}{6\pi}\,\frac{A1}{A3}$$

If a filter of characteristic $A3/A1=10$ (20 db), is used, there is obtained:

$$\frac{(d\phi)}{(2\pi)}\max=0.5\%$$

A phase-shifting circuit receiving sine-wave input signals has just been described. It is to be understood that rectangular input signals can also be used and that signal 8 can be transformed into rectangular signals. In an embodiment, circuit 12 is suppressed and pulses of low duty factor can be applied to input 3. If the output signal is transformed into a rectangular signal, its phase can be measured with respect to one of the signals delivered by counter 13.

It is also possible to feed a three-phase condenser with rectangular signals and to filter the output signal. It will be noted, however, first, that it is more difficult to obtain, by construction, a good precision of the condenser and second, that a ring counter directly delivering signals of duty factor ½ cannot be used. If a normal counter is used, the duty factor of the signals is $d=1/3$ and the output signal comprises a second harmonic with a ratio $H2/H1=1/2$, which is unfavorable for the filtering.

While the principles of the above invention have been described in connection with specific embodiments and particular modifications thereof it is to be clearly understood that this description is made by way of example and not as a limitation of the scope of the invention.

We claim:

1. A phase-shifting circuit comprising:

a source of input signal of frequency F;

a pulse-forming means coupled to said source of input signal delivering short duration pulses of frequency NF at its output;

pulse counting means coupled to said pulse-forming means delivering at N outputs N rectangular output signals corresponding to each cycle of N short duration pulses appearing at its input, said rectangular output signals being 360°/N out of phase with respect to each other when N is integer equal to at least three and less than five;

adjustable phase shifting means coupled to the N outputs of said pulse counting means; and output means coupled to said phase shifting means for delivering a sinusoidal output signal of frequency F, said output signal having a phase shift which varies with the adjustment of said phase shifting means.

2. A phase-shifting circuit according to claim 1 wherein said pulse counting means includes a scale-of-N ring counter.

3. A phase-shifting circuit according to claim 1 wherein said phase shifting means includes an N-phase-shifting capacitor.

4. A phase-shifting circuit according to claim 1 wherein said output means includes:

a buffer coupled to said phase shifting means; and a low pass filter coupled to said buffer having a cut-off frequency F for delivering a sinusoidal output signal of frequency F, said output signal having a phase shift which varies with the adjustment of said phase shifting means.

5. A phase-shifting circuit according to claim 1 wherein said phase shift of said sinusoidal output signal varies substantially linearly with the adjustment of said phase shifting means.

6. A phase-shifting circuit comprising:

a source of input signal of frequency F;

pulse-forming means coupled to said source of input signal delivering short duration pulses of frequency 4F at its output terminal;

pulse counting means coupled to said pulse-forming means delivering at four outputs four rectangular output signals of duty factor 0.5 corresponding to each cycle of four short duration pulses appearing at its input, said rectangular output signals being 90° out of phase with respect to each other;

adjustable phase shifting means coupled to the 4 outputs of said pulse counting means; and output means coupled to said phase shifting means for delivering a sinusoidal output signal of frequency F, said output signal having a phase shift which varies with the adjustment of said phase shifting means.

7. A phase-shifting circuit according to claim 6 wherein said pulse counting means includes a scale-of-four ring counter.

8. A phase-shifting circuit according to claim 6 wherein said pulse-forming means includes:

a frequency quadrupler receiving input signals of frequency F; and a pulse shaping circuit coupled to said frequency quadrupler.

9. A phase-shifting circuit according to claim 6 wherein said phase shifting means includes a four-phase phase-shifting capacitor.

No references cited.

ARTHUR GAUSS, *Primary Examiner.*

J. ZAZWORSKY, *Assistant Examiner.*